United States Patent
Andrews

[11] 3,803,015
[45] Apr. 9, 1974

[54] ELECTROCHEMICAL DRILLING

[75] Inventor: Laurence R. Andrews, Agawam, Mass.

[73] Assignee: United Aircraft Corporation, East Hartford, Conn.

[22] Filed: Nov. 1, 1972

[21] Appl. No.: 302,993

[52] U.S. Cl. ............ 204/224 M, 204/225, 204/286, 204/297 R
[51] Int. Cl. ......... B23p 1/02, B23p 1/12, B01k 3/04
[58] Field of Search .......... 204/224 M, 225, 297 R, 204/297 W, 297 M, 286

[56] References Cited
UNITED STATES PATENTS

| | | | |
|---|---|---|---|
| 3,719,579 | 3/1973 | Cross et al. ................ | 204/224 M X |
| 3,433,727 | 3/1969 | Keeleric ........................ | 204/224 M |
| 2,721,839 | 10/1955 | Taylor ............................ | 204/297 W |
| 2,505,531 | 4/1950 | Ellwood ........................ | 204/297 M |

*Primary Examiner*—John H. Mack
*Assistant Examiner*—D. R. Valentine
*Attorney, Agent, or Firm*—Charles A. Warren

[57] ABSTRACT

In electrochemical drilling in multiple setups, the electrodes are guided by precisely located guide tubes into contact with the workpiece and the latter is located on a base in precise relation to the electrode tips so as to have the holes properly located in the workpiece. The latter is supported by a shuttle in which the workpiece will have previously been positioned so that the shuttle serves as a precision locator for the workpiece. The ends of the electrodes remote from the operative end thereof enter a fluid chamber by which electrolyte under pressure may be supplied to all the electrodes simultaneously.

8 Claims, 3 Drawing Figures

ELECTROCHEMICAL DRILLING

BACKGROUND OF THE INVENTION

In multiple drilling by electrochemical drilling, electrodes must all be precisely located and guided in order to have the holes in the exact desired relation especially when the holes are not all parallel to one another. Where the electrodes are very small for drilling small diameter holes, they are flexible to a degree and must be guided at a point close to the workpiece. Further, since electrochemical drilling involves the removal of material, this takes place not only at the electrode but on adjacent parts of the apparatus. If precise locating points for the workpiece are provided adjacent to the electrodes, they are immersed in the electrolyte and soon lose their effective locating characteristics by reason of the electrolytic action thereon. This prevents successive workpieces from being precisely located with the necessary accuracy in relation to the operative ends of the electrodes.

STATEMENT OF THE INVENTION

One feature of the invention is an arrangement for guiding the several electrodes at a point close to the work to assure precise positioning of the holes drilled by the electrodes. Another feature is the arrangement by which these guides permit drilling of several holes that are not necessarily in parallel relation to one another.

One feature of the invention is an arrangement for precisely locating the workpiece in relation to the electrodes by locating elements not affected by the electrolytic action. Another feature is a fixture in which the workpiece is precisely located and which in turn may be accurately positioned in the electrochemical drilling machine for the drilling operation.

According to the invention, the machine has a plurality of guides located adjacent to the workpiece and through which the electrodes are guided into contact with the workpiece. These guides are in precise alignment with the location of the holes to be drilled in the workpiece. Guide extensions extend from these guides and at their ends remote from the guides are all brought into parallel relation so as to receive the electrodes therein. These electrodes are all connected to a slide for movement of electrodes in unison toward the workpiece and the slide also serves as a chamber for electrolyte from which all of the electrodes are supplied with electrolyte simultaneously.

The workpieces are precisely located in a fixture which in turn is mounted in the base of the machine in an area that is subject to very little electrolytic action so that the locating means will not quickly be eroded away to lose their effectiveness.

DETAILED DESCRIPTION OF THE PREFERRED EMBODIMENT

Figure 1:
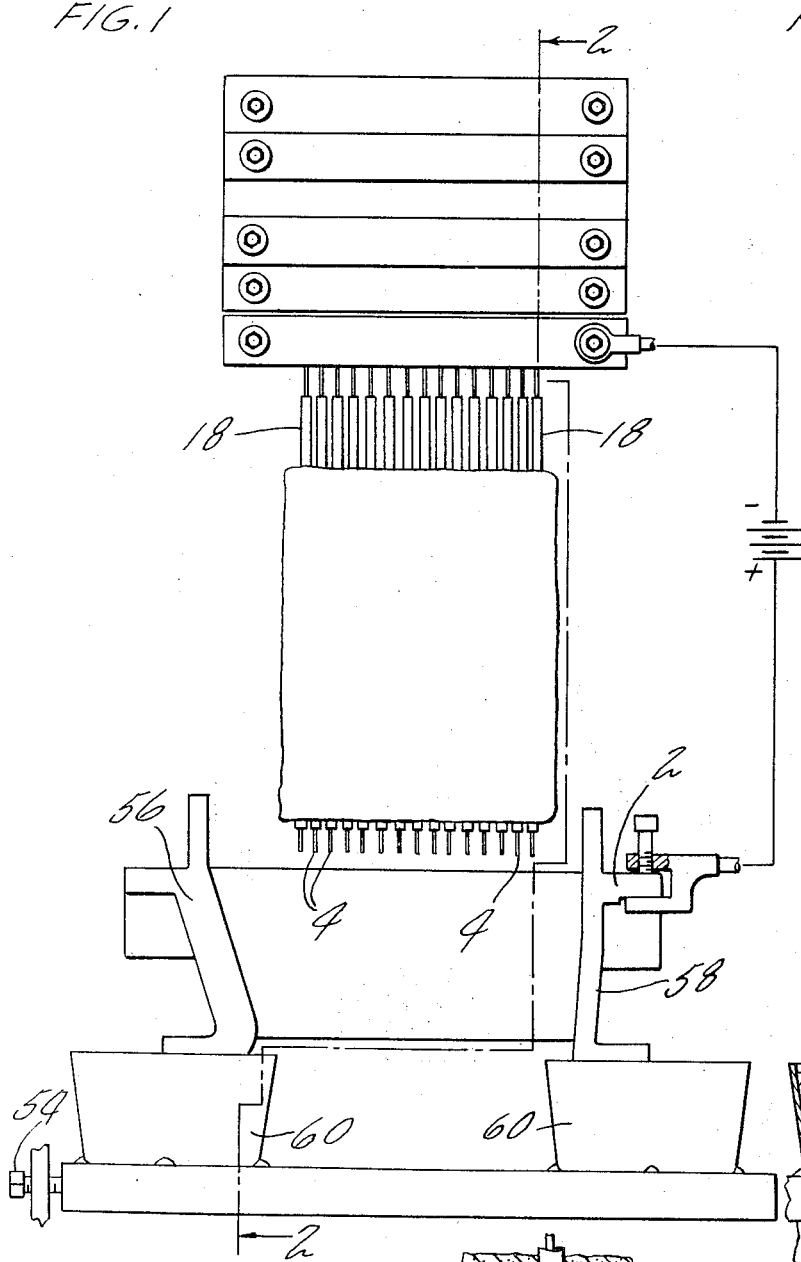
FIG. 1 is a front elevation of a machine embodying the invention.
Figure 2:
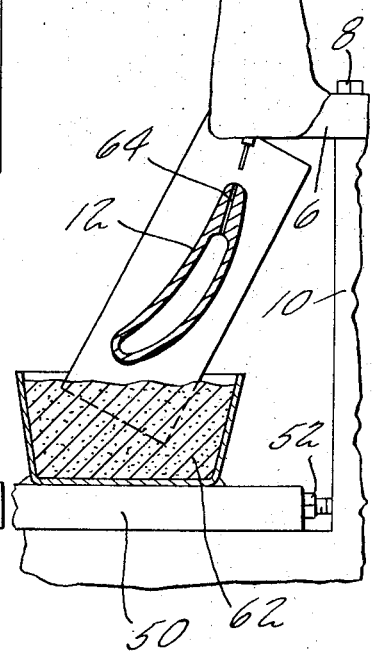
FIG. 2 is a side elevation of the device with parts broken away.
Figure 3:
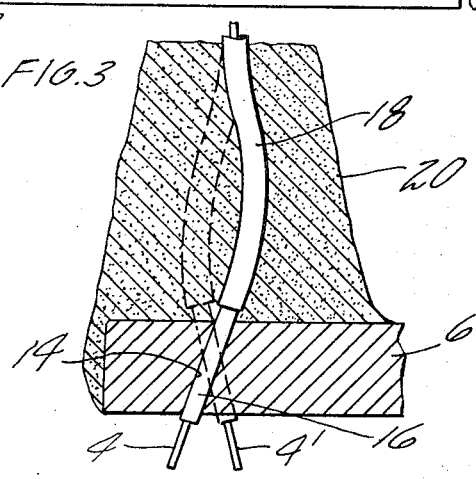
FIG. 3 is a fragmentary sectional view showing the arrangement of the guides and guide extensions.

Referring first to FIG. 1, the workpiece 2 is mounted in a position to be engaged by a plurality of electrodes 4 supported by a bracket 6 attached as by bolts 8 to a portion 10 of the base 11. In the arrangement shown the workpiece 2 is a turbine vane having an airfoil section 12 and the latter has a twist in it from end to end so that the electrode tips utilized for drilling the holes in the trailing edge are not strictly in parallel relation to one another. As shown in FIG. 3, the electrode tip 4 for drilling one end hole in the vane is at a different angle from the other end electrode 4' which drills the far end hole at the opposite end of the vane.

The bracket 6 has a plurality of holes 14 drilled therein in precise alignment with the location of the holes to be drilled in the workpiece and these holes 14 receive by guide tubes 16 which extend through the bracket 6 and fit securely in the holes 14. The guide tubes 14 are connected by elongated guide tubes 18 which fit over the upper ends of the guide tubes 14 and are then all brought into parallel relation to one another so that at their upper ends the elongated guide tubes 18 will hold all of the electrodes therein in precise parallel relation to one another.

These elongated guide tubes 18 may be held in the position shown by a suitable potting compound, epoxy, or other bedding compound. This material is preferably a dielectric and is associated with and attached to the bracket 6 so that it all becomes one supporting element for the guides 14 and the guide tubes 18.

The ends of the electrodes 4 that project from the upper ends of the guide tubes 18 are all held in position on a slide 20 by a clamping structure 22. This includes a block 24 attached to the slide and a cooperating block 26. These blocks are located on opposite sides of the collection of electrodes with the block 26 clamped against the electrodes by suitable bolts 28.

Located above the clamping structure is a chamber consisting of two cooperating elements, a base 30 and a cover 32 having cooperating recesses 34 and 36 to form the chamber 38 into which the upper ends of the electrodes extend. The cap 32 is held in position as by bolts 40. A suitable gasket 42 between the base and the cap provides a seal between these two members and also a seal to clamp the electrode tips where they extend upwardly into the cavity 38. The bolts 40 extend through bars 44 that extend over the cap 32. Other bolts 46 FIG. 1, hold the base 30 on the slide 20.

The workpiece is located in precise relation to the tips of the electrodes by mounting the workpiece on a shuttle 50 which is located on the base 11 by locating screws 52 for forward and back location of the shuttle 50 and other locating screws 54 which locate the shuttle 50 crosswise on the base. When properly located, the shuttle 50 is clamped in position by suitable clamps not shown.

The workpiece has end shroud elements 56 and 58 at opposite ends of the airfoil portion 12 and portions of these shroud elements project into cups 60 on the shuttle 50. These cups are filled with a suitable potting material 62 such as an epoxy or a plaster of Paris which fits securely around a portion of each of the end shrouds 56 and 58 and thereby secures the workpiece itself in precise relation on the shuttle 50 on which it is mounted. With the locating screws 52 and 54, it will be apparent that this shuttle will be precisely positioned on the machine base so that the shuttle 50 will hold the workpiece, the turbine vane, in this instance, in exactly the position for the drilling of the holes in the trailing edge 64 of the airfoil portion of the vane.

In operation, when the workpiece which in the arrangement shown is a turbine vane, is positioned precisely on the machine by the use of the shuttle 50, the electrochemical drilling operation is started by filling the chamber 38 with an electrolyte as through a port 66 so that it flows through all of the electrodes at once. Then a downward movement of the slide 20 feeds the electrodes toward the workpiece and into the holes being drilled therein. The flow of electrolyte through the electrodes causes the electrochemical action by which the hole is drilled. It will be understood that a suitable electrical current is imposed between the workpiece and the tips of the electrodes adjacent to the workpiece. Such electrical supply is familiar in the art and need not be described further.

As the slide 20 moves down, the electrodes 4 slide through the guide extensions 18 and through the guides 14 which as above stated direct these electrode tips toward and into the workpiece in the precise position and direction required for the holes being drilled in the trailing edge of the workpiece.

The arrangement by which the vane or workpiece 2 is located with respect to the shuttle 50 is described and claimed in a copending application of Andrews, Serial No. (EH-4910).

I claim:

1. In a device for electrochemically drilling a plurality of holes in the workpiece:
   a base;
   a support for a workpiece removably mounted on said base, said base having support locating means thereon;
   a guide block mounted in fixed position on said base;

a plurality of guide tubes in said block in alignment with the location of the plurality of holes to be drilled in the workpiece;
   a plurality of electrodes slidably positioned in said guide tubes and guided therein for the operative end of each electrode to engage with the workpiece; and
   slide means on said base in which the ends of the electrodes remote from the workpiece are mounted for feeding said electrodes toward the workpiece, said electrodes sliding in and guided by the guide tubes.

2. Apparatus as in claim 1 in which said slide means has a chamber for electrolyte with the ends of the electrodes extending into said chamber.

3. An apparatus as in claim 2 in which the slide means has a clamp thereon for holding said electrodes to the slide means and for causing unison movement of all the electrodes.

4. Apparatus as in claim 1 in which said support includes at least one tray to receive a hardening compound in which a part of the workpiece is secured.

5. A device for use in electrochemically drilling a plurality of holes in a workpiece simultaneously including:

a base;
   a support removably mounted on the base to hold a workpiece in position for drilling the plurality of holes therein simultaneously;
   a guide means adjacent to and in fixed relation to said support having a plurality of guide passages therein in axial alignment with the location of the holes to be drilled in the workpiece;
   a plurality of electrodes slidably positioned in said passages;
   a mounting on said base for supporting one end of each of the plurality of electrodes;
   guide tubes extending from said guide passages toward said mounting and receiving the electrodes;

said mounting having clamping means for holding said one end of all of said electrodes, and having a chamber communicating with said one end of all said electrodes for supplying electrolyte thereto; and
   means for causing a relative movement between said mounting and said support to feed the electrodes through the guide means toward the workpiece.

6. A device as in claim 5 in which the guide tubes are positioned in said guide passages and closely fit each of the electrodes individually.

7. A device as in claim 5 in which the guide tubes are all arranged in parallel relation at the end adjacent to the mounting and in which the guide tubes at their other end are in axial alignment with the guide passages.

8. A guide member for electrodes in an electrochemical drilling operation for use in simultaneously drilling a plurality of nonparallel holes in the workpiece, said guide member having a plurality of passages therein in precise alignment with the location of the plurality of holes in the workpiece,
   a plurality of guide tubes, one in each passage, to receive the electrodes guided therein; and
   guide extensions connected at one end to said guide tubes, the other ends of said guide extensions being located in parallel relation to one another; and
   means for holding said guide tubes and extensions securely in position to receive the electrodes.

* * * * *